United States Patent [19]

Kiuchi

[11] Patent Number: 4,839,655

[45] Date of Patent: Jun. 13, 1989

[54] MOVING TARGET DETECTOR SIGNAL PROCESSOR ENABLING SELECTED VIDEO OUTPUT WITH SMOOTH AMPLITUDE

[75] Inventor: Eiichi Kiuchi, Tokyo, Japan

[73] Assignee: NEC Corporation, Tokyo, Japan

[21] Appl. No.: 945,693

[22] Filed: Dec. 23, 1986

[30] Foreign Application Priority Data

Dec. 23, 1985 [JP] Japan .................................. 60-289787
Jan. 7, 1986 [JP] Japan .................................... 61-8590

[51] Int. Cl.⁴ ............................................. G01S 13/54
[52] U.S. Cl. ......................................... 342/93; 342/90
[58] Field of Search .......................... 342/90, 93, 162

[56] References Cited

U.S. PATENT DOCUMENTS

| | | | |
|---|---|---|---|
| 3,587,097 | 6/1971 | Stull, Jr. | 342/93 |
| 3,968,490 | 7/1976 | Gostin | 342/92 X |
| 4,137,532 | 1/1979 | Taylor, Jr. et al. | 342/93 |
| 4,159,477 | 6/1979 | Le Beyec | 342/93 |
| 4,318,101 | 3/1982 | Musha et al. | 342/93 |
| 4,488,154 | 12/1984 | Ward | 342/93 X |
| 4,503,432 | 3/1985 | Bailey | 342/93 |
| 4,513,286 | 4/1985 | Irabu | 342/93 |
| 4,586,043 | 4/1986 | Wolf | 342/93 |
| 4,622,556 | 11/1986 | Bryant et al. | 342/93 X |

OTHER PUBLICATIONS

McCrae et al., "A Three-Pulse Moving Target Detector", Converence Arlington, VA, Apr. 28-30, 1980.
Johnson et al., "On Characterizing the Performance of Modified CFAR Radar Processors in the Presence of Non-Homogeneous Interference", Proc. of 1984 Int'l Symposium on Noise and Clutter Rejection in Radars and Imaging Sensors, IECE, 1984, pp. 285-290.

Primary Examiner—Thomas H. Tarcza
Assistant Examiner—Tod Swann
Attorney, Agent, or Firm—Foley & Lardner, Schwartz, Jeffery, Schwaab, Mack, Blumenthal & Evans

[57] ABSTRACT

A radar system includes N Doppler filters (N is an integer larger than 1), N CFAR (Constant False Alarm Rate) processing means, a video selector, automatic target detecting means, a video integrator, and a D/A converter. The N CFAR processing means are respectively connected to output terminals of the Doppler filters and automatically adapt amplitude distribution characteristics of a signal, such as clutter and receiver noise, and convert the signal into a signal having the same amplitude distribution characteristics as the receiver noise and suppressing the converted signal. The video selector is connected to output terminals of the N CFAR processing means and selects an output signal from any one thereof in units of radar range bins and synthesizes an N channel signals into a single channel signal. The automatic target detecting means is connected to an output terminal of the video selector. The video integrator is connected to an output terminal of the video selector and generates a signal at each transmission pulse by interpolating a single Doppler filter output signal for each M ($\geq$N) transmission pulses. The D/A converter is connected to the video integrator and generates an analog video signal.

9 Claims, 8 Drawing Sheets

MOVING TARGET DETECTOR SIGNAL PROCESSOR ENABLING SELECTED VIDEO OUTPUT WITH SMOOTH AMPLITUDE

BACKGROUND OF THE INVENTION

The present invention relates to a radar system.

Some recent radar systems adopt an arrangement obtained by combining MDF (Multiple Doppler Filters) processing and LOG/CFAR (Constant False Alarm Rate) processing. This arrangement serves as a means effective for detecting a target signal from an aircraft, a ship, a vehicle or the like, and removing or suppressing an unnecessary signal, such as ground clutter (power reflected by the ground surface, e.g., mountains, woods and forests, fields, buildings or the like), sea clutter, weather clutter (reflected power caused by a meteorogical phenomenon such as a rain cloud and snow), and so on.

Figure 1:
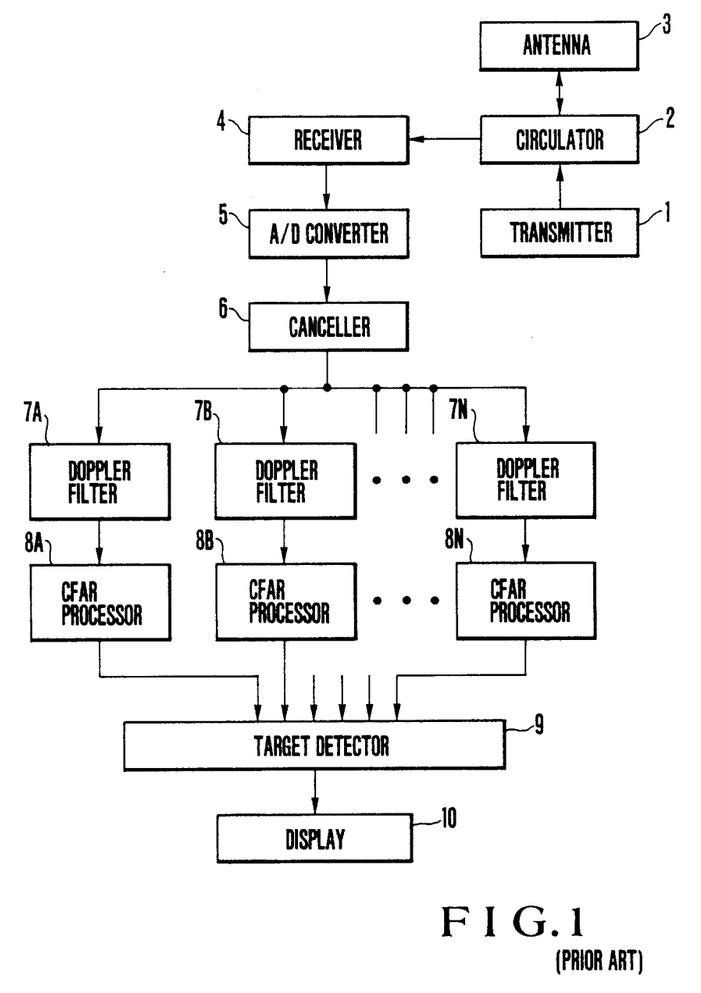
FIG. 1 is a block diagram for explaining a radar system of a conventional design.

FIG. 1 is a block diagram showing a conventional radar system having such an arrangement. Referring to FIG. 1, a transmitter 1 and a receiver 4 are connected to an antenna 3 via a circulator 2. A transmitted pulse output from the transmitter 1 is input to the antenna 3 via the circulator 2 and radiated as short pulse radio waves. After the radio waves are reflected by a target and received by the antenna 3 again, they are input to the receiver 4 via the circulator 2. The receiver 4 mixes the received radio waves with a transmission frequency component, detects a frequency component corresponding to a difference between the transmission frequency and the received waves, and supplies the frequency component to an A/D converter 5. The A/D converter 5 converts the difference frequency component into a digital signal and supplies it to a canceller 6. When steady-state homogenously distributed signals are present, the canceller 6 discriminates them as a fixed clutter and cancels them out. An output signal from the canceller 6 is supplied to Doppler filters 7A to 7N.

Each of the Doppler filters 7A to 7N extracts only a signal component within its passband designed in advance. This is based on the following principle. More specifically, various types of targets and unnecessary background signals have inherent relative speeds with respect to the radar. Therefore, signals received by the radar from these background signals have inherent Doppler frequency components. When an MDF consisting of a plurality of Doppler filters having different passbands is provided, these reflected signals can be separated by utilizing the differences in Doppler frequency.

The target and clutter signals separatively detected by the respective Doppler filters 7A to 7N are input to CFAR processors 8A to 8N connected to the output terminals of the Doppler filters 7A to 7N, respectively, and are subjected to statistical normalizing processing in terms of amplitude. The principle of LOG/CFAR is as follows. Generally, a clutter signal spreads spatially uniformly since its respective reflection points that contribute to reflection exist in an area sufficiently larger than a radar range resolution defined by the pulsewidth of the radar. In contrast to this, a target signal is a point target since the physical size of a target is usually equal to or less than the radar range resolution. As a result, the clutter signal is sufficiently suppressed by LOG/CFAR processing, i.e., statistical normalizing processing, in terms of amplitude in the range direction, while the target signal is not, in principle, influenced by LOG/CFAR processing. In particular, it is theoretically accepted that, when the statistic characteristic of the amplitude of a clutter signal is in accordance with the Rayleigh distribution (many weather clutters and some sea clutters are known to be in accordance with the Rayleigh distribution), the clutter signal is suppressed to have the same amplitude distribution as the receiver noise by LOG/CFAR processing.

In this manner, it is possible to separate target and clutter signals and to suppress only the clutter signal by the Doppler filters 7A to 7N and the CFAR processors 8A to 8N.

Referring to FIG. 1, output signals from the CFAR processors 8A to 8N are input to an automatic target detector 9. The automatic target detector 9 conventionally performs automatic target detection in units of Doppler filter channels for the following reasons. As described above, each clutter signal has an inherent Doppler frequency and its statistical characteristic is different depending on the object contributing to reflection. When the reflecting object is an aggregate of uniform reflection points, such as a rain cloud, it can often be described in accordance with the Rayleigh distribution. However, when the reflecting object is an aggregate of non-uniform reflection points, as in the case of ground clutter, it is possibly in accordance with the Weibull distribution or the Log-Normal distribution. In this manner, the amplitude distribution characteristics of a clutter signal vary depending on the type of clutter, the physical characteristic of the reflecting object, and so on, and thus amplitude distribution characteristics after MDF and LOG/CFAR processings also vary.

When automatic target detection is to be performed, a detection threshold level must be automatically controlled in order to correspond to the amplitude distribution characteristics of various remaining clutter signals after clutter suppression processing and to suppress the probability of erroneously detecting a remaining clutter signal as the target signal at a predetermined level or lower. The signal amplitude distribution characteristics differ from one Doppler filter channel to another in accordance with the presence/absence of clutter and with the type of clutter. Also, the presence/absence and the type of clutter changes from one area to another. Therefore, the automatic threshold control must be independently performed in units of Doppler filter channels.

However, the conventional method of a radar system which comprises an automatic target detection/processing means in units of Doppler filter channels has the following drawbacks. First, a received signal is digitized into a binary signal by a threshold level which is preset in accordance with a remaining clutter level in units of Doppler filter channels. A target is finally discriminated. With this method, an optimally selected video signal cannot be obtained because amplitude information is lost due to quantization process in the stage of the target detector, where the optimally selected video signal is such a signal that preserves amplitude information of target, receiver noise and clutter residue. Amplitude interpolation for target signal should be considered when necessary to reconstruct the partially deteriorated target amplitude due to canceller processing. Therefore, when a malfunction of an automatic target detecting/processing system, a disturbance, or an interference occurs to disable automatic detection, an video allowing visual determination by an operator cannot be provided.

Second, the target detection/processing systems must be provided to coincide in number with the Doppler filter channels, resulting in a large hardware scale.

SUMMARY OF THE INVENTION

It is, therefore, an object of the present invention to provide a high-operability, economical radar system in which the above drawbacks are removed and which can provide an optimum video signal as well as symbol representation as a result of automatic target detection.

In order to achieve the above objects, the present invention has the following means and arrangement. More specifically, a radar system according to the present invention comprises: N Doppler filters (N is an integer larger than 1) each of which has a configuration of a digital filter with M stages (M is an integer); N CFAR processing means, respectively connected to output terminals of the Doppler filters for suppression of spaciously spreading clutter signals; a video selector, connected to output terminals of the N CFAR processing means, for selecting an output signal from any one thereof in units of radar range bins and synthesizing N channel signals into a single channel signal; automatic target detecting means connected to an output terminal of the video selector; a video integrator, connected to an output terminal of the video selector, for reproducing a signal at each transmission pulse by interpolating a Doppler filter output signal for each M transmission pulse hits; and a D/A converter, connected to the video integrator, for generating an analog video signal.

DESCRIPTION OF THE PREFERRED EMBODIMENTS

Figure 2:
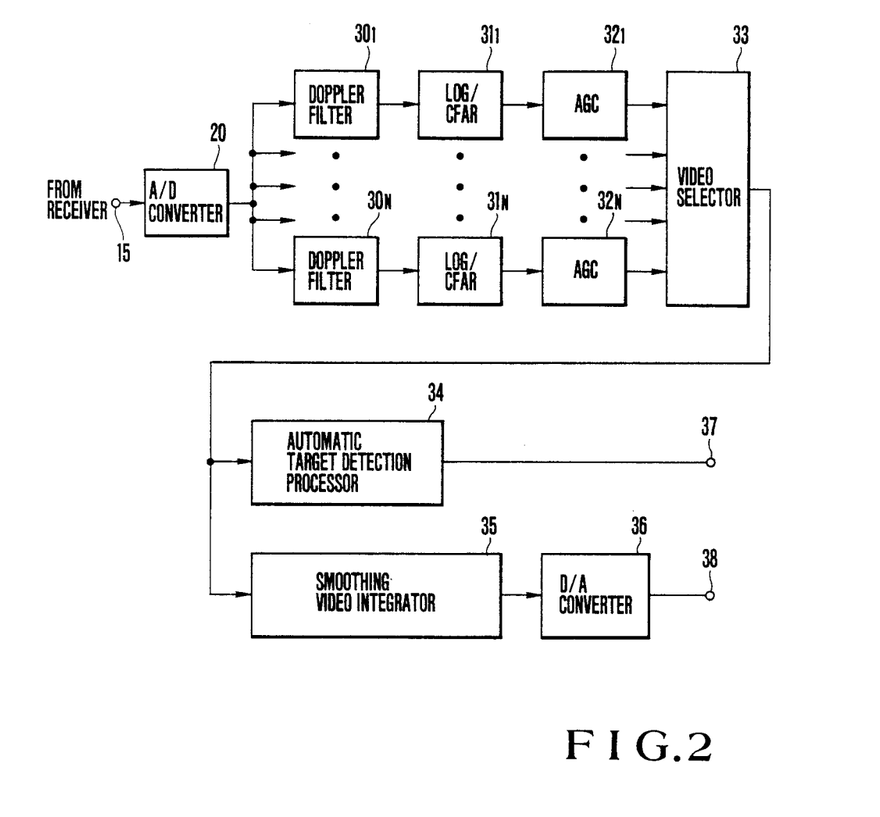
FIG. 2 is a block diagram showing an arrangement according to an embodiment of the present invention.

The embodiments of the present invention will be described with reference to the accompanying drawings. FIG. 2 is a function block diagram showing an arrangement of an embodiment of the present invention.

The radar system of the present invention shown in FIG. 2 has a received signal video input terminal 15, an A/D converter 20, Doppler filters $30_1$ to $30_N$, LOG/CFARs $31_1$ to $31_N$, automatic gain controllers (AGCs) $32_1$ to $32_N$, a video selector 33, an automatic target detection processor 34, a smoothing video integrator 35, a D/A converter 36, an automatic target detection signal output terminal 37, and a reproduced processed video signal output terminal 38.

Referring to FIG. 2, a received video signal is input to the A/D converter 20 from the input terminal 15 and is applied to the N-channel Doppler filters $30_1$ to $30_N$ in parallel to each other. The Doppler filters $30_1$ to $30_N$ have different pass bands so as to cover the entire Doppler frequency band with the N channels. Therefore, various target and clutter signals having different Doppler frequencies are divided into the separate Doppler filters. Target and clutter signals having the same Doppler frequency pass the same Doppler filter. In any event, a signal divided in units of Doppler frequency bands is subjected to mean value division by the LOG/CFARs $31_1$ to $31_N$. A clutter signal spreading in the range direction is suppressed by the LOG/CFARs to a level corresponding to that of receiver noise, and a target signal which exists only in a pulse-like manner in the range direction is passed through the LOG/CFARs with merely a small processing loss. In this manner, clutter suppress processing is completed, and automatic target detection processing is started.

Move specifically, the various clutter signals are divided by a mean value level and suppressed by the LOG/CFARs $31_1$ to $31_N$. The amplitude distribution characteristics after suppress processing are not uniform because of the amplitude distribution characteristics of the clutter signals. Automatic gain control is performed by the AGCs $32_1$ to $32_N$ in order to control the clutter signals so that the remaining clutter levels become the same, i.e., so that the probabilities of erroneously determining the remaining clutter signal as the target become the same among the N-channel Doppler filter channels.

The AGCs $32_1$ to $32_N$ can detect a maximum value of a remaining signal amplitude after LOG/CFAR processing within a predetermined range, and perform automatic gain control in order to give attenuation proportional to the detected maximum amplitude. In this manner, a maximum value of the level-controlled N-channel signals is selected by the video selector 33 in units of the range bins, and the selected signals are synthesized into a 1-channel signal.

After maximum value selection and synthesis, the signal is subjected to target detection processing by the 1-channel automatic target detection processor 34, in a similar manner to the conventional radar system which does not have MDF, and is output from the output terminal 37.

It must be noted that, when a Weibull CFAR processing means is used as the CFAR processing means, a clutter suppression effective for a signal in accordance with the Weibull distribution, as ground clutter, can be obtained.

After maximum value selection and synthesis, the signal is also subjected to video reproduction by the smoothing video integrator 35 in order to reproduce a video signal for visual discrimination by the radar operator.

More specifically, in this embodiment MDF processing is performed once per N hits. Therefore, in the output from the video selector 33, a single signal per N hits is obtained, i.e., signals for N-1 hits are omitted. In order to reproduce these absent components, a signal per N hits is interpolated by feedback integrator processing, and a signal for each hit is thus output.

Figure 3A:
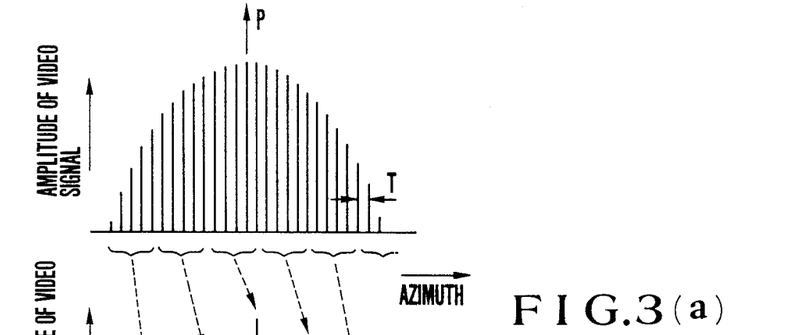
FIG. 3 shows waveform charts for explaining the operation of the radar system shown in FIG. 2.
Figure 3B:
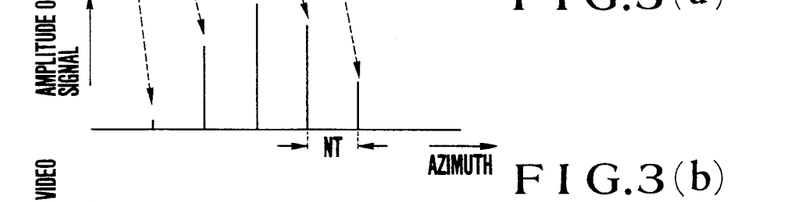
Figures 3C, 3D:
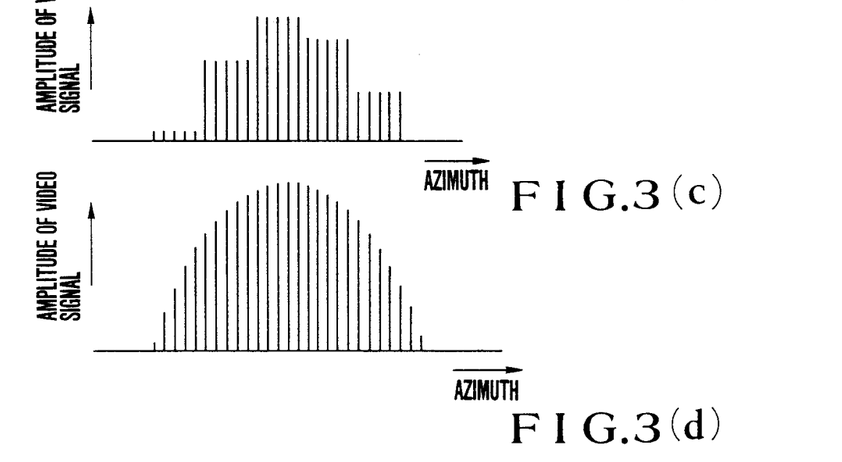

FIG. 3 shows waveform charts for explaining the change of a point target signal due to MDF processing and video reproduction processing. FIG. 3(a) shows an amplitude change of a received video signal with respect to an ideal point target. FIG. 3(b) shows an amplitude change of a point target when N=5 after the signal shown in FIG. 3(a) is subjected to MDF processing. More specifically, one signal per 5 hits is shown in FIG. 3(b) and 4-hit signal components are absent. FIG. 3(c) shows a signal waveform wherein the absent signal components are reproduced with pseudo signals having the same amplitude as that which has been received at first. When the thus-obtained signal is smoothed by the feedback integrator, a signal waveform as shown in FIG. 3(d), which is substantially the same as that shown in FIG. 3(a) adequate for visual discrimination by the operator, can be obtained. The video signal processed in this manner is converted into an analog video signal by the D/A converter 36 and is supplied to a radar display from the output terminal 38.

As described above, according to the radar system of the present invention, signals of a plurality of channels which have been subjected to MDF processing and CFAR processing are synthesized into a single channel signal while any one channel is selected by the selector in units of range bins. Thereafter a target is detected. Therefore, only a single automatic target detection processing system is needed, and a hardware scale can be considerably reduced than a conventional one.

A signal component of a frequency which is absent due to MDF processing is interpolated by a video reproducing means from a signal synthesized into one channel, and hence an optimum video signal can be provided. Thus, the radar video signal can be displayed to allow the operator to discriminate the presence/absence of the target as needed.

Figure 4:
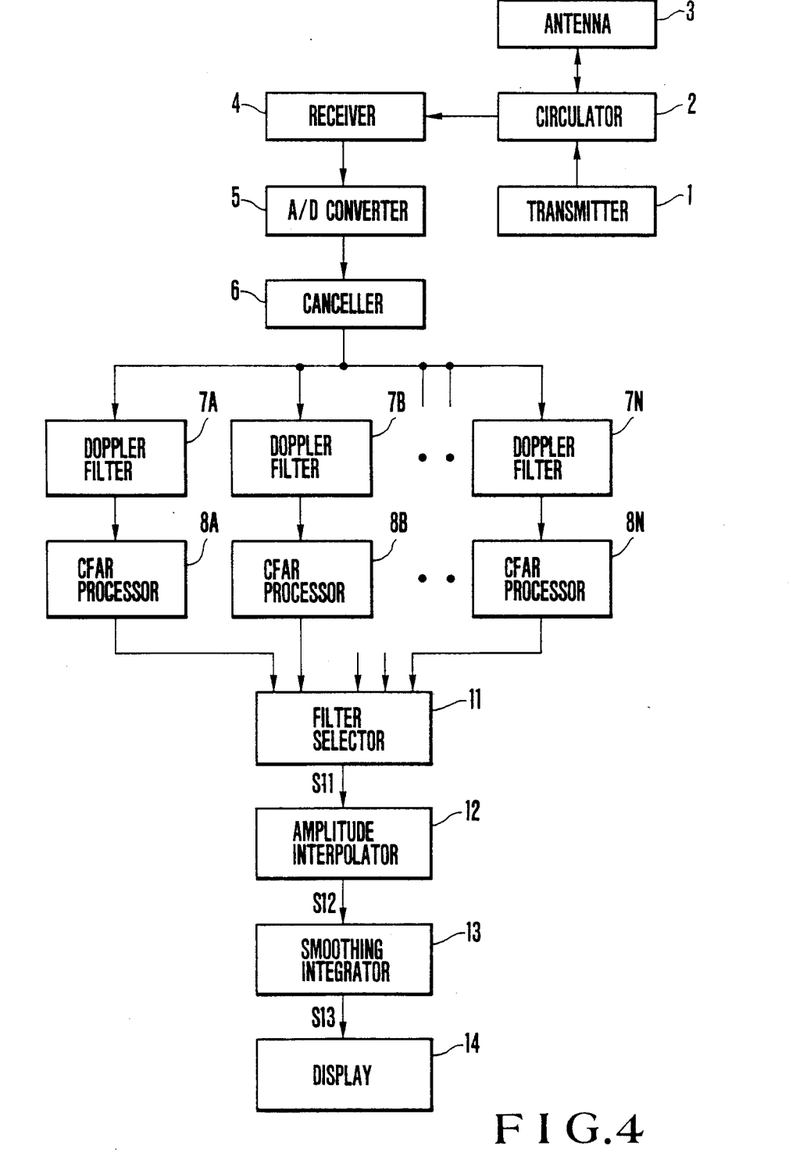
FIG. 4 is a block diagram showing an arrangement of another embodiment of the present invention.

In reference to FIG. 4, signal output from a filter selector 11 is supplied to an amplitude interpolator 12. The amplitude interpolator 12 compares 3 signals continuously present in adjacent azimuths in the same range. A signal level corresponding to a central azimuth, among the three continuous azimuths, is replaced by a signal level as an average of the signal levels corresponding to the adjacent azimuths only when it is smaller than them. An output S12 from the amplitude interpolator 12 is free from blip separation, as shown in FIG. 5B. At this time, when the reflected signal level is smaller than a certain threshold level, i.e., when the reflected signal cannot be distinguished from noise, the above processing is not performed so as not to emphasize the blip of a remaining clutter signal or a noise signal.

Figure 5A:
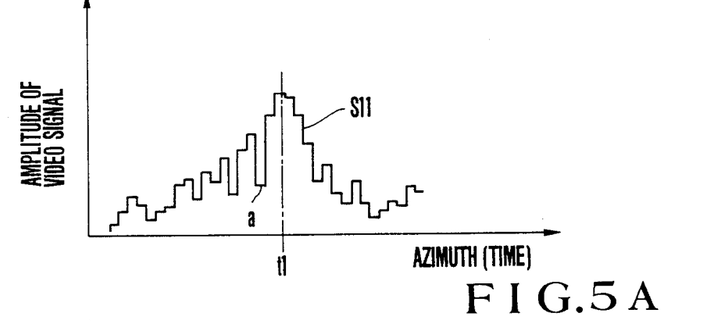
FIGS. 5A to 5C are graphs for explaining the output waveforms from the major portions of the circuit shown in FIG. 4.
Figure 5B:
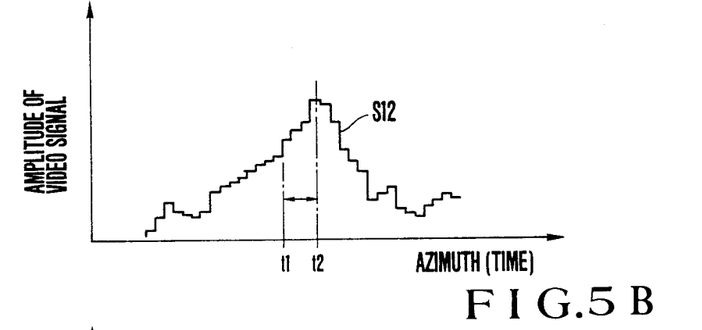
Figure 5C:
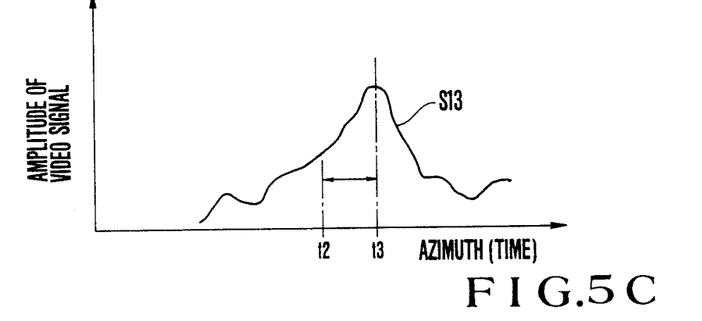

An output signal S12 from the amplitude interpolator 12 is input to and smoothed by a smoothing integrator 13 to have a waveform as shown in FIG. 5C, and is supplied to a display 14 and used for signal display.

FIG. 4 is a block diagram of another embodiment of the present invention. The same reference numerals in FIG. 4 denote the same portions as in the conventional technique of FIG. 1. The embodiment of FIG. 4 is different from that of FIG. 1 in the following respects. In FIG. 4, the respective outputs from CFAR processors 8A to 8N are input to a filter selector 11. The filter selector 11 selects a signal having the maximum amplitude among the outputs from the respective CFAR processors in units of range bins.

FIG. 5A shows an example of the output signal S11 from the filter selector 11. In FIG. 5A, a relationship between the amplitudes of video signals reflected by points in predetermined ranges from the radar system and their azimuths is shown (the signals are input and output using azimuth as the time base). As shown in FIG. 5A, a signal level drop may occur due to the blind speed and so on of the target, as indicated by a, even in a reflected signals from the target in continuous or adjacent azimuths. When such a signal is displayed on the display, a blip separation or incomplete blip occurs. As a result, when the operator monitors the display, he may erroneously identify a blip or the azimuth measuring precision may be degraded. As is apparent from FIGS. 5A, 5B, and 5C, the maximum values of the output signals S11, S12, and S13 from the filter selector 11, the amplitude interpolator 12, and the smoothing integrator 13, respectively, are not present in the same azimuth, and a time lag exists because of the operation time, as indicated by t1, t2, and t3. However, the time lag can be compensated for by correcting the azimuth signals. In this manner, a blip separation or blip absence on the display is prevented.

Figure 6:
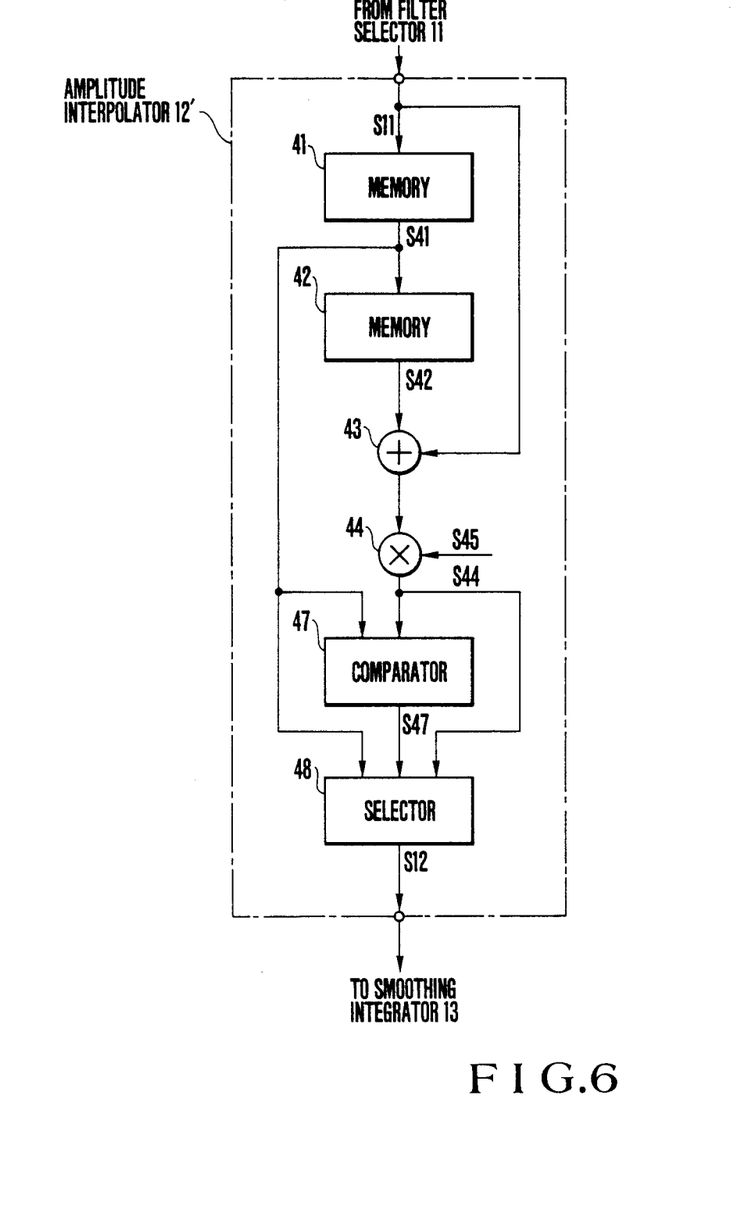
FIG. 6 is a circuit diagram of an embodiment of an amplitude interpolator shown in FIG. 4.

FIG. 6 is a block diagram showing the arrangement of a first embodiment of the amplitude interpolator 12 shown in FIG. 4. Referring to FIG. 6, an amplitude interpolator 12' has memories 41 and 42, an adder 43, a multiplier 44, a comparator 47, and a selector 48. The memories 41 and 42 are controlled so that the signal S11 is sequentially written in and read out from them in synchronism with the output timing of the signal S11 from the filter selector 11. Therefore, the input signal S11 and output signals S41 and S42 from the memories 41 and 42, respectively, are reflected signals corresponding to points in three continuous azimuths and at the same distance from the radar system. The multiplier 44 is a kind of a coefficient setter, which is controlled by a multiplicand S45 set as ½ and produces an output ½ the input signal level. Thus, the comparator 47 compares a signal level of a certain azimuth (the memory output signal S41) with a mean value (a multiplier output signal S44) of the signal levels of the adjacent azimuths. When S41>S44, the comparator 47 outputs a control signal S47 to the selector 48 so that the selector 48 receives the signal S41; when S41<S44, it outputs a control signal S47 to the selector 48 so that the selector 48 receives the signal S44. The selector 48 outputs either the signal S41 or S44 as the output signal S12 from the amplitude interpolator 12' in accordance with the control signal S47.

Figure 7:
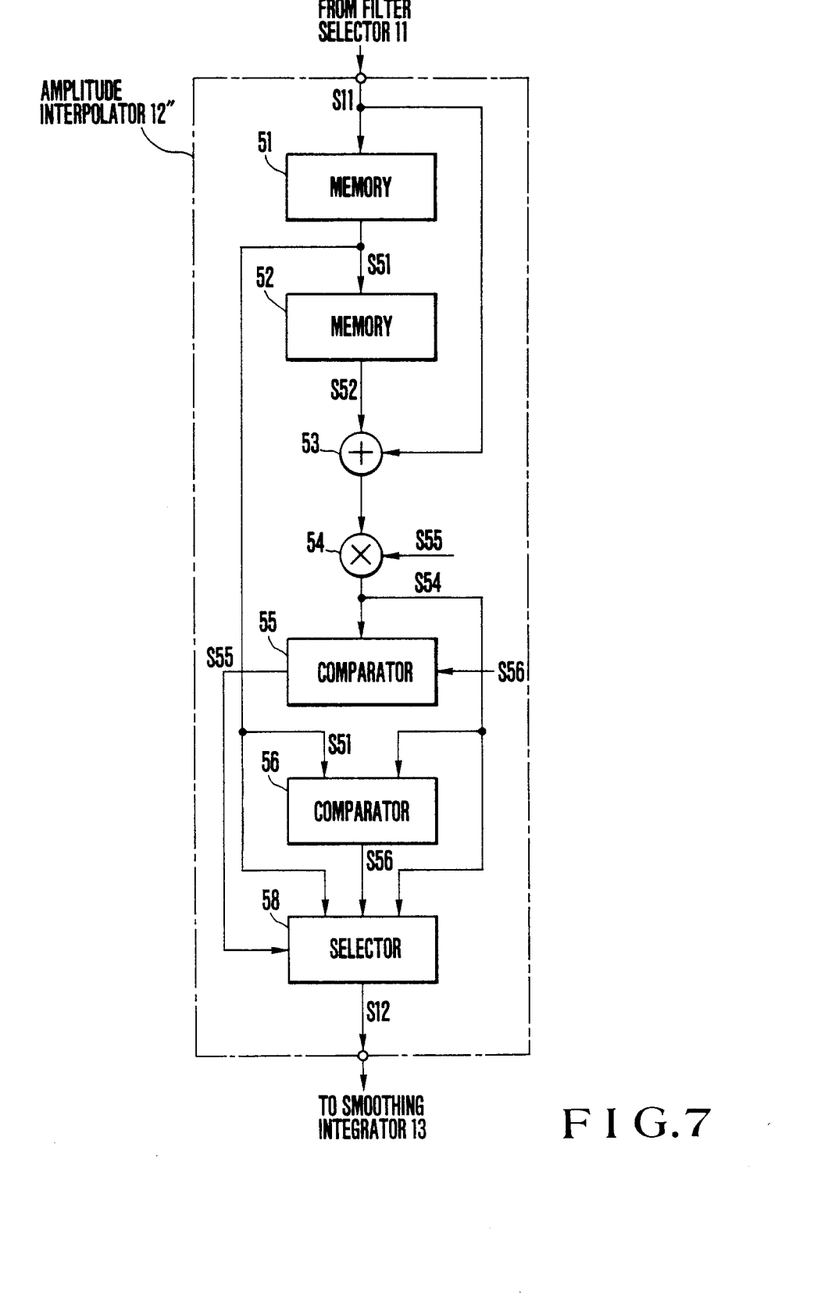
FIG. 7 is a circuit diagram of another embodiment of the amplitude interpolator shown in FIG. 4.

FIG. 7 is a block diagram showing the arrangement of a second embodiment of the amplitude interpolator. Referring to FIG. 7, an amplitude interpolator 12'' has memories 51 and 52, an adder 53, a multiplier 54, comparators 55 and 56, and a selector 58. The comparator 55 compares a multiplier output signal S54 (a mean value of signal levels of azimuths adjacent to a certain azimuth) with a threshold value S56. When S54<S56, the comparator 55 outputs an output signal S51 from the memory 51 (the level of a received signal of a certain detection azimuth) as an output signal S12 of the amplitude interpolator 12''. When S54>S56, the same operation as in FIG. 6 is performed.

Figure 8:
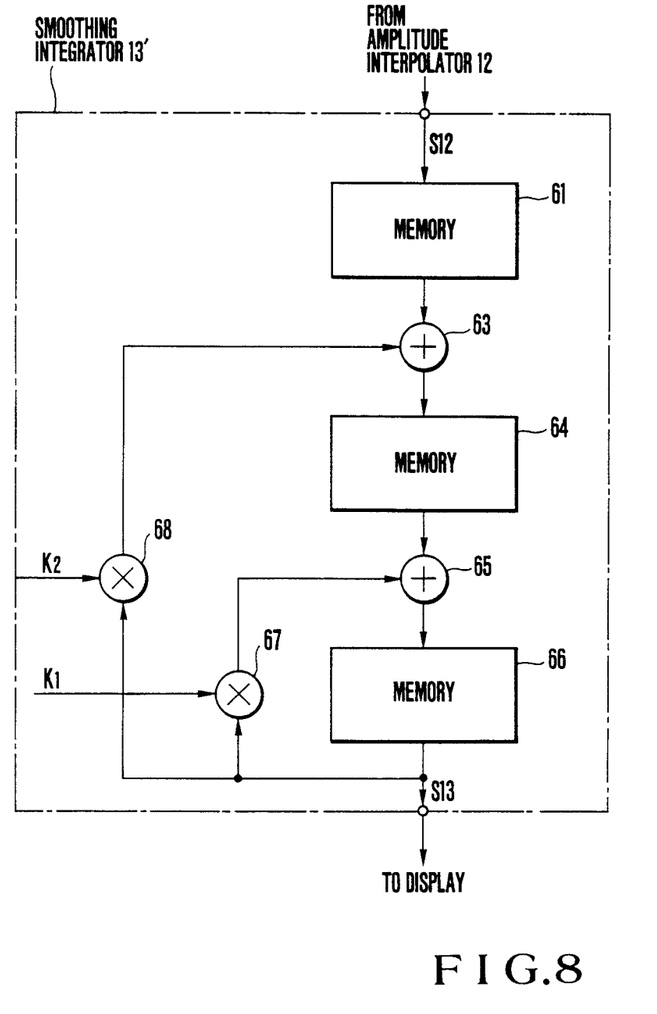
FIG. 8 is a circuit diagram of an embodiment of a smoothing integrator shown in FIG. 4.

FIG. 8 is a block diagram showing an embodiment of the smoothing integrator 13 shown in FIG. 4. A smoothing integrator 13' has memories 61, 64, and 66, adders 63 and 65, and multipliers 67 and 68. An output signal S12, within a range of a predetermined azimuth, is input to and stored in the memory 61 from the amplitude interpolator 12. Signals of azimuths in the same range are read out from the memory 61, pass the adder 63, the memory 64, the adder 65, and the memory 66, and are output as a smoothing integrator output signal S13. At the same time, the signal S13 is applied to the adders 65 and 63 via the multipliers 67 and 68. The multipliers 67 and 68 also receive multiplicands K1 and K2, thus constituting a feedback integrator.

The memories 64 and 66 store the received signal read out from the memory 61, and sequentially read out the stored signal to a next circuit after a predetermined period of time has elapsed. The memories 64 and 66 serve as delay circuits. The multiplicands K1 and K2 are preset in order to approximate the signal S13 to the directivity of an output signal waveform shown in FIG. 5C. In this manner, signal display free from a blip separation or incomplete blip can be performed, resulting in an improvement in display and visibility azimuth precision.

What is claimed is:

1. A radar system comprising:
    N Doppler filters, each of which has a configuration of a digital filter with M stages; where N is an integer larger than 1 and M is an integer;
    means, including N Weibull Constant False Alarm Rate processors for Constant False Alarm Rate processing outputs of said N Doppler filters, respectively, for totally approximately an amplitude distribution of spaciously spreading clutter signals including a ground clutter signal and a weather clutter signal to a Weibull distribution to simultaneously suppress the ground clutter and weather clutter signals;
    a video selector, connected to output terminals of said N Weibull Constant False Alarm Rate processors, for selecting an output signal of any one thereof in units of radar range bins and synthesizing N channel signals into a single channel signal;
    amplitude interpolating means supplied with the output signal of said video selector, when a signal level with respect to an azimuth in a range is smaller than a value uniquely determined as a function of signal levels with respect to adjacent azimuths in said range, for providing an output signal level having the uniquely determined value with respect to said azimuth in said range thereby restoring an amplitude of a target signal which is lost due to a blind speed during moving target indication of one of said N Doppler filters; and
    integrating means for performing smoothing integration of the output signal level from said amplitude interpolating means with respect to predetermined azimuths in a same range, thereby generating a blip signal amplitude-weighted according to an antenna pattern.

2. A radar system according to claim 1, wherein said amplitude interpolating means further comprises:
    first and second memories, connected in series with each other, for sequentially storing and outputting an input signal at an input timing of the input signal;
    an arithmetic operational circuit for calculating half of a sum of the input signal and an output from said second memory; and
    comparing/selecting means for comparing an output from said arithmetic operational circuit with an output from said first memory and outputting a larger output.

3. A radar system according to claim 2, wherein said amplitude interpolating means further comprises a comparator for comparing the output from said arithmetic operational circuit and a preset threshold value and, when the output is larger than the threshold value, activating said comparing/selecting means.

4. A radar system according to claim 1, wherein said smoothing integrating means includes memories, connected in series with each other in stages to constitute a delay circuit, and means for adding to an output from each of said memories a product obtained by multiplying an output from a memory of the last stage by a predetermined multiplicand, and for inputting the obtained sum to a memory of a next stage.

5. A radar system comprising:
    N Doppler filters, each of which has a configuration of a digital filter with M stages; where N is an integer larger than 1 and M is an integer;
    N LOG/CFAR processors for Constant False Alarm Rate processing outputs of said N Doppler filters, respectively, by totally approximately an amplitude distribution of spaciously spreading clutter signals to a Rayleigh distribution to suppress spaciously spreading clutter signals other than a residue signal due to a ground clutter having a non-Rayleigh distribution;
    N automatic gain adjusting means supplied with output signals of said N LOG/CFAR processors, respectively for suppressing the respective residue signals;
    a video selector, connected to output terminals of said N automatic gain adjusting means for selecting an output signal from any one thereof in units of radar range bins and synthesizing N channel signals into a single channel signal;
    automatic target detecting means connected to an output terminal of said video selector;
    a video integrator, connected to an output terminal of said video selector, for reproducing a signal at each transmission pulse by interpolating Doppler filter output signals for each M transmission pulse hits; and
    a digital-to-analog converter, connected to said video integrator, for generating an analog video signal.

6. A radar system according to claim 5, wherein said automatic gain adjusting means comprises means for detecting a maximum value of an amplitude of the remaining signal within a predetermined range after Constant False Alarm Rate processing, and automatic gain control means which performs automatic gain adjustment in order to give an attenuation proportional to the detected maximum amplitude.

7. A radar system according to claim 5, wherein said video integrator comprises:
    first and second memories, connected in series with each other, for sequentially storing and outputting an input signal at an input timing of the input signal;
    an arithmetic operational circuit for calculating half of a sum of the input signal and an output from said second memory; and
    comparing/selecting means for comparing an output from said arithmetic operational circuit with an output from said first memory and outputting a larger output.

8. A radar system according to claim 5, wherein said video integrator further comprises a comparator for comparing the output from said arithmetic operational circuit and a preset threshold value and, when the output is larger than the threshold value, activating said comparing/selecting means.

9. A radar system according to claim 5, wherein said video integrator includes memories, connected in series with each other in stages to constitute a delay circuit, and means for adding to an output from each of said memories a product obtained by multiplying an output from a memory of the last stage by a predetermined multiplicand, and for inputting the obtained sum to a memory of a next stage.

* * * * *